US008007152B2

(12) United States Patent
Nakabayashi

(10) Patent No.: US 8,007,152 B2
(45) Date of Patent: Aug. 30, 2011

(54) LIGHTING DEVICE FOR VEHICLE

(75) Inventor: Masaaki Nakabayashi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 185 days.

(21) Appl. No.: 12/551,832

(22) Filed: Sep. 1, 2009

(65) Prior Publication Data

US 2010/0053987 A1 Mar. 4, 2010

(30) Foreign Application Priority Data

Sep. 2, 2008 (JP) ................................ 2008-224657

(51) Int. Cl.
*B60Q 1/00* (2006.01)

(52) U.S. Cl. ........ 362/538; 362/509; 362/511; 362/543; 362/544; 362/545

(58) Field of Classification Search .................. 362/538, 362/509, 511, 543, 544, 545, 520
See application file for complete search history.

(56) References Cited

U.S. PATENT DOCUMENTS

2005/0068787 A1* 3/2005 Ishida .......................... 362/538
2007/0177400 A1* 8/2007 Tatsukawa .................... 362/514
2007/0183164 A1 8/2007 Naganawa et al.
2008/0062706 A1* 3/2008 Feldmeier ..................... 362/459
2008/0112180 A1* 5/2008 Okada .......................... 362/518
2008/0253142 A1* 10/2008 Nakada ......................... 362/507

FOREIGN PATENT DOCUMENTS

DE 10065020 A1 3/2002
DE 102005036018 A1 2/2007
JP 2007-213879 A 8/2007

OTHER PUBLICATIONS

European Search Report dated Dec. 10, 2009 issued in counterpart application No. 09169083.4, 5 pages.

* cited by examiner

*Primary Examiner* — Jong-Suk (James) Lee
*Assistant Examiner* — Mark Tsidulko
(74) *Attorney, Agent, or Firm* — Sughrue Mion, PLLC

(57) ABSTRACT

A lighting device for a vehicle is provided. The lighting device includes a projection lens disposed on an optical axis and having a focal line, a first light emitting device disposed on a rear side of the focal line, a reflector which reflects light toward the focal line; a shade which shields a part of the light; a second light emitting device disposed on a rear side of the first light emitting device; and a light guide. The light guide includes an incident portion into which light emitted from the second light emitting device is introduced, a light guiding portion which guides the light, a shielding portion which forms a part of the shade, and an emitting portion coupled to the shielding portion and disposed on the focal line or in a vicinity of the focal line. The emitting portion emits the light guided by the light guiding portion.

6 Claims, 4 Drawing Sheets

LIGHTING DEVICE FOR VEHICLE

This application claims priority to Japanese Patent Application No. 2008-224657, filed Sep. 2, 2008, in the Japanese Patent Office. The Japanese Patent Application No. 2008-224657 is incorporated by reference in its entirety.

TECHNICAL FIELD

The present disclosure relates to a lighting device for a vehicle which includes a projection lens to be extended in a direction of a focal line.

RELATED ART

As an example of a related-art lighting device for a vehicle, JP-A-2007-213879 Publication describes a lighting device for a vehicle includes a first subunit and a second subunit. The first subunit is of a direct incident type for causing light emitted from a first light emitting device to be incident on a projection lens, and the second subunit is of an indirect incident type for reflecting a light emitted from a second light emitting device by a reflector and causing the reflected light to be incident on the projection lens. The first subunit and the second subunit are arranged on left and right at a rear side of the projection lens.

In the related art lighting device described in the JP-A-2007-213879 Publication, however, there is a disadvantage in that the first subunit and the second subunit have separate structures in a transverse direction of the projection lens. Accordingly, a large space in the transverse direction is required. More specifically, a substrate of the first light emitting device requires a certain size, and the second light emitting device also requires a space corresponding to the substrate. With an arrangement in which a subunit having a reflector is arranged on the left and right, a lighting device for a vehicle becomes long in the transverse direction. Therefore, it becomes difficult to use such a related art lighting device in a vehicle which is intended for a reduction in a size in a transverse direction.

SUMMARY

Exemplary embodiments of the present invention provide a lighting device for a vehicle which can maintain an excellent condition in respect of a design and can reduce a size in the transverse direction.

A lighting device for a vehicle according to an exemplary embodiment of the invention, the lighting device comprises:

a projection lens disposed on an optical axis which extends in a longitudinal direction of the vehicle, the projection lens having a focal line which extends in a lateral direction of the vehicle, and the projection lens extending in a direction of the focal line;

a first light emitting device disposed on a rear side of the focal line of the projection lens;

a reflector which reflects light emitted from the first light emitting device toward the focal line;

a shade which shields a part of the light reflected by the reflector;

a second light emitting device disposed on a rear side of the first light emitting device; and a light guide comprising an incident portion into which light emitted from the second light emitting device is introduced, a light guiding portion which guides the light introduced into the incident portion, a shielding portion which forms at least a part of the shade, and an emitting portion coupled to the shielding portion and disposed on the focal line or in a vicinity of the focal line, the emitting portion emitting the light guided by the light guiding portion.

Other features and advantages may be apparent from the following detailed description, the accompanying drawings and the claims.

BRIEF DESCRIPTION OF THE DRAWINGS

FIG. 4 is a sectional view taken along a B-B line in the lighting device for a vehicle in FIG. 1, and.

DETAILED DESCRIPTION OF EXEMPLARY EMBODIMENTS OF THE INVENTION

A plurality of exemplary embodiments according to the invention will be described below with reference to FIGS. 1 to 5. In description, a front, a rear, a left and a right are based on directions of the vehicle, and a downward direction in FIG. 1 indicates an irradiating direction of the lighting device for a vehicle.

First Exemplary Embodiment

Figure 1:
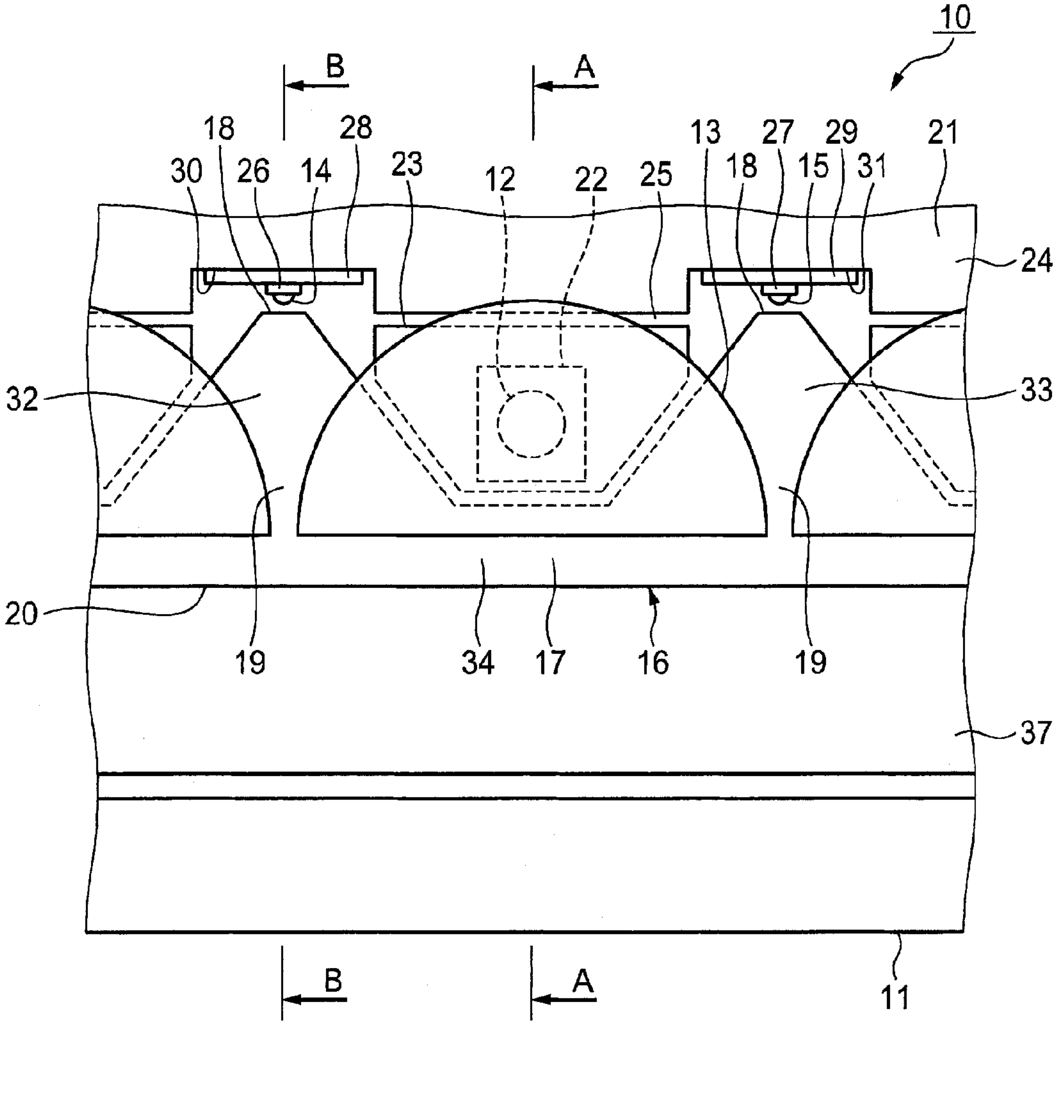
FIG. 1 is a plan view showing a lighting device for a vehicle according to a first exemplary embodiment of the invention.
Figure 2:
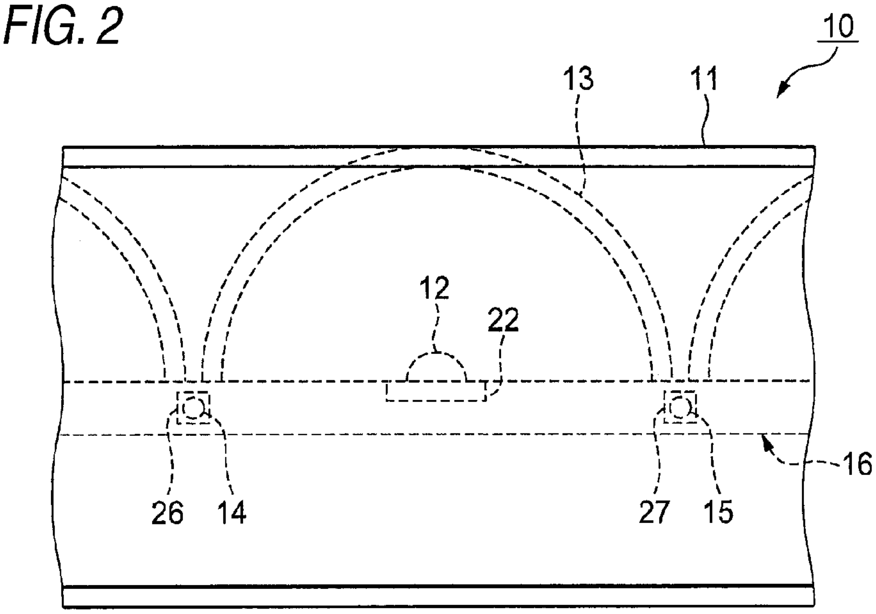
FIG. 2 is a front view showing the lighting device for a vehicle in FIG. 1.
Figure 3:
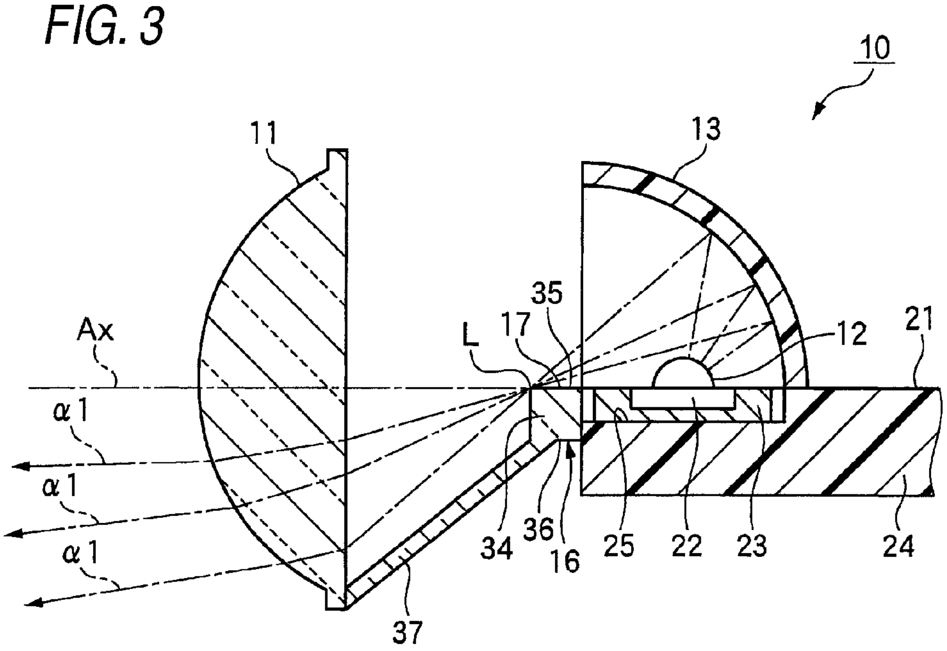
FIG. 3 is a sectional view taken along an A-A line in the lighting device for a vehicle in FIG. 1.

As shown in FIGS. 1 to 3, a lighting device 10 for a vehicle according to the first exemplary embodiment of the invention includes a projection lens 11 disposed on an optical axis Ax (see FIG. 3) which extends in a longitudinal direction of the vehicle. The projection lens 11 has a focal line L which extends in a lateral direction, and the projection lens 11 extends in a direction of the focal line L. The projection lens 11 is a cylindrical lens which is long in the lateral direction.

The lighting device 10 for a vehicle includes a first light emitting device 12 disposed on a rear side of the focal line L of the projection lens 11, and a reflector 13 for reflecting a light $\alpha 1$ emitted from the first light emitting device 12 toward the focal line L in a forward part. Moreover, the lighting device 10 for a vehicle includes a plurality of second light emitting devices 14 and 15 disposed on the rear side of the focal line L of the projection lens 11.

The lighting device 10 for a vehicle includes a light guide 16 having an incident plane 18 to be an incident portion for introducing a light $\alpha 2$ emitted from the second light emitting device 14, a light guiding portion 19 for guiding the light introduced from the incident plane 18, and a shielding portion 17 for forming a part of a shade. The light guide 16 has, on a front surface thereof, an emitting plane 20 to be an emitting portion which is linked to the shielding portion 17 and is disposed on the focal line L of the projection lens 11 or in the vicinity thereof, and serves to emit a light guided to the light guiding portion 19 in a direction of the projection lens 11.

The lighting device 10 for a vehicle is attached to a lamp body 21 of a front combination light together with a headlight unit which is not shown.

As shown in FIG. 3, the first light emitting device 12 has a substrate 22 fixed to a base 23. The base 23 is fixed to a first light emitting device attaching surface 25 formed on an attaching plate 24 of the lamp body 21 by a step portion. The first light emitting device 12 is applied as a light source for a fog lamp. The first light emitting device 12 may be applied as a light source for a low beam in place of the light source for a fog lamp.

The reflector 13 has an elliptical shape for reflecting the light α1 emitted from the first light emitting device 12 toward the focal line L in the forward part, and an opening portion is disposed on the projection lens 11 side and is fixed to the attaching plate 24 of the lamp body 21 to surround an upper part of the first light emitting device 12. A first subunit of a reflection type is formed by the first light emitting device 12 and the reflector 13.

The second light emitting devices 14 and 15 are disposed in the vicinity of an outside of the reflector 13 at both sides of the first light emitting device 12, respectively. The second light emitting devices 14 and 15 have substrates 26 and 27 fixed to bases 28 and 29, respectively.

The second light emitting devices 14 and 15 are disposed at an obliquely rear side of the first light emitting device 12. Therefore, it is possible to reduce intervals between the first light emitting device 12 and the second light emitting devices 14 and 15 as seen from the front. Accordingly, it is possible to reduce a width dimension of the lighting device 10 for a vehicle.

The bases 28 and 29 are fixed to second light emitting device attaching surfaces 30 and 31, respectively, formed on the attaching plate 24 of the lamp body 21. The second light emitting devices 14 and 15 have the bases 28 and 29 fixed to the second light emitting device attaching surfaces 30 and 31 respectively, thereby irradiating a light in a forward direction. The second light emitting devices 14 and 15 are used as light sources for a Daytime Running Lamp (DRL). The second light emitting devices 14 and 15 may alternatively be used as a light source for a position lamp in place of the light source for the DRL.

The light guide 16 is formed by using a transparent resin material as a raw material. In the light guide 16, a left light guide 32 disposed on a left side of the first light emitting device 12 and a right light guide 33 disposed on a right side of the first light emitting device 12 in FIG. 1 are continuously formed integrally through a shade portion 34. A second subunit of a light guiding type is formed by the second light emitting devices 14 and 15 and the light guide 16.

As shown in FIG. 3, the light guide 16 has, on an upper surface thereof, a first reflecting layer 35 for forming a part of the shielding portion 17 and has, on a lower surface thereof, a second reflecting layer 36 for forming the other part of the shielding portion 17. The first and second reflecting layers 35 and 36 are formed by deposition of Al, or by sputtering of Cr or Al. The first reflecting layer 35 is disposed to be coincident with the optical axis Ax of the light α1 emitted from the first light emitting device 12 rearward from the focal line L of the projection lens 11 or the vicinity thereof. Therefore, it is possible to easily form a light distribution of the light incident on the projection lens 11.

The light guide 16 is provided with a lens supporting portion 37 for supporting the projection lens 11 in a tip part on the projection lens 11 side. Consequently, the projection lens 11 is positioned with respect to the light guide 16 by means of the lens supporting portion 37 and is thus disposed in a predetermined position of the lighting device for a vehicle.

The shade portion 34 is disposed on the upper surface of the light guide 16. The shade portion 34 comprises the first reflecting layer 35 of the shielding portion 17. Therefore, the light α1 emitted from the first light emitting device 12 and reflected by the reflector 13, and transmitted toward the projection lens 11 through the upper surface of the light guide 16 is partially cut by the shade portion 34 and is then advanced in a downward direction from the projection lens 11.

Figure 4:
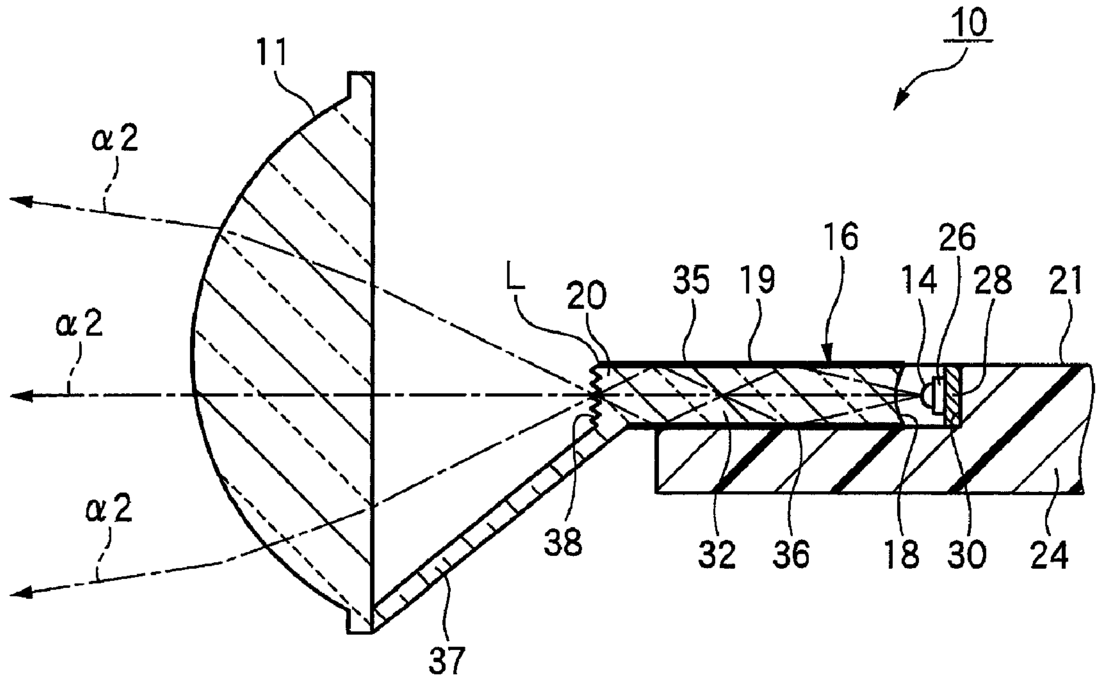

As shown in FIG. 4, the light guide 16 has the incident plane 18 to be an incident portion disposed on a base end at the second light emitting device 14 side and has the emitting plane 20 to be an emitting portion disposed in a tip part of the light guiding portion 19. A step 38 having a plurality of concavo-convex shapes is formed on the emitting plane 20.

The light α2 emitted from the second light emitting device 14 is incident from the incident plane 18 and is reflected by the first reflecting layer 35 and the second reflecting layer 36, and at the same time, is advanced, and is diffused and emitted by the step 38 of the emitting plane 20. Then, the emitted light α2 is irradiated on a forward part of the vehicle from the projection lens 11.

At this time, the emitted light α2 is not emitted from a tip part of the reflector 13 but the emitting plane 20 which is close to the projection lens 11 via the light guide 16. Therefore, it is possible to obtain an optimum light distributing characteristic without blocking the light α1 emitted from the first light emitting device 12 through the reflector 13.

As described above, according to the lighting device 10 for a vehicle in accordance with the first exemplary embodiment, the first light emitting device 12 is disposed on the rear side of the focal line L of the projection lens 11 and the second light emitting devices 14 and 15 are disposed on the rear side of the first light emitting device 12. Consequently, the first subunit comprising the first light emitting device 12 and the reflector 13, and the second subunit comprising the second light emitting devices 14 and 15 and the light guide 16 can be formed as an integral structure. In addition, the second light emitting devices 14 and 15 are disposed on the rear side of the first light emitting device 12 and the light emitted from the second light emitting devices 14 and 15 are guided to the forward side through the light guide 16. Therefore, it is possible to reduce an interval of the first subunit related to the first light emitting device 12. Accordingly, it is possible to obtain an excellent condition in respect of a design and to reduce a size in respect of a space.

In the light guide 16, moreover, the shielding portion 17 shields a part of the light reflected by the reflector 13, and furthermore, the light guiding portion 19 guides the light α2 emitted from the second light emitting devices 14 and 15 from the incident plane 18 and emits the light α2 from the emitting plane 20. Thus, it is possible to decrease the number of the components by using a single light guide 16 having a shade function and a light guiding function.

Moreover, the second light emitting devices 14 and 15 disposed on the obliquely rear side of the first light emitting device 12 are provided on the parallel surface with the optical axis Ax extending from the first light emitting device 12. Therefore, it is possible to suppress an expansion in a vertical direction of a light emitted from the projection lens 11.

Furthermore, the shielding portion 17 is formed integrally between the adjacent light conducting portions 19. Therefore, a bonding line between the adjacent light guiding portions 19 can be prevented from being generated on a cutoff line.

In addition, the light α2 which is emitted from the second light emitting devices 14 and 15 and is incident on the light guide 16 is diffused by the step 38 of the emitting plane 20. Therefore, the light α2 is emitted from the projection lens 11 in the horizontal and upward directions. Thus, it is possible to enhance a visibility.

Moreover, the projection lens 11 is positioned and supported by the lens supporting portion 37 of the light guide 16 and can be easily disposed in position in the lighting device 10 for a vehicle.

Second Exemplary Embodiment

Next, a lighting device for a vehicle according to a second exemplary embodiment of the invention will be described with reference to FIG. 5.

In the following second exemplary embodiment, the same components as those in the first exemplary embodiment have the same reference numerals and a description thereof will be omitted.

Figure 5:
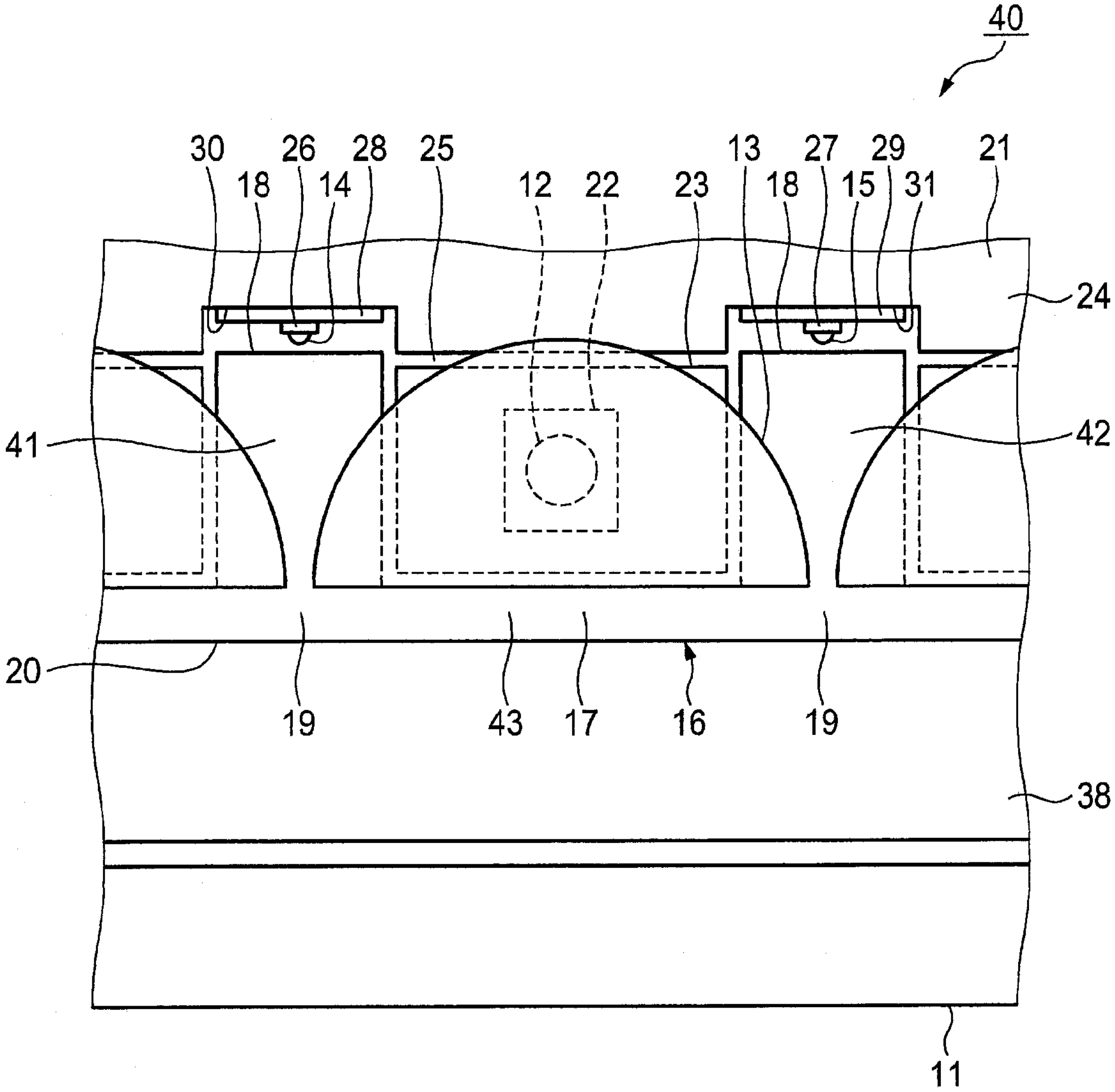
FIG. 5 is a plan view showing the lighting device for a vehicle according to a second exemplary embodiment of the invention.

As shown in FIG. 5, a lighting device 40 for a vehicle according to the second exemplary embodiment of the invention includes a light guide 16 which divides a left light guide 41 disposed on a left side of a first light emitting device 12 and a right light guide 42 disposed on a right side of the first light emitting device 12 in FIG. 5. An independent shade portion 43 is disposed ahead of both of the light guides 41 and 42.

The lighting device 40 for a vehicle according to the second exemplary embodiment can produce the same functions and advantages as those in the first exemplary embodiment, and particularly, it is possible to simplify shapes of the light guides 41 and 42 as seen on a plane. Thus, a working property can be enhanced.

A lighting device for a vehicle according to an exemplary embodiment of the invention, comprises:

a projection lens disposed on an optical axis extended in a longitudinal direction of the vehicle, having a focal line extended in a lateral direction, and extended in a direction of the focal line;

a first light emitting device disposed on a rear side of the focal line of the projection lens;

a reflector which reflects a light emitted from the first light emitting device toward the focal line;

a shade which shields a part of the light reflected by the reflector;

a second light emitting device disposed on a rear side of the first light emitting device; and a light guide having an incident portion which introduces a light emitted from the second light emitting device, a light guiding portion which guides the light introduced from the incident portion, a shielding portion which forms at least a part of the shade, and an emitting portion linked to the shielding portion, disposed on the focal line or in the vicinity of the focal line and serving to emit the light guided to the light guiding portion.

According to the lighting device for a vehicle having the structure, the first light emitting device is disposed on the rear side of the focal line of the projection lens and the second light emitting device is disposed on the rear side of the first light emitting device. Consequently, it is possible to obtain an integral structure of a subunit constituted by the first light emitting device and the reflector and a subunit constituted by the second light emitting device and the light guide. In addition, the second light emitting device is disposed on the rear side of the first light emitting device and the light of the second light emitting device is guided to a forward side through the light guide. Therefore, it is possible to reduce an interval of the subunit related to the first light emitting device. Accordingly, it is possible to obtain an excellent condition in respect of a design and to reduce a mounting space in a transverse direction of the projection lens.

Moreover, a part of the light reflected by the reflector for reflecting the light emitted from the first light emitting device is shielded by the shielding portion. Moreover, the light emitted from the second light emitting device is introduced from the incident portion, and the light thus introduced is guided by the light guiding portion and the light thus guided is emitted from the emitting portion. Consequently, the single light guide has a shielding function and a light guiding function. Consequently, it is possible to reduce the number of components.

In the lighting device for a vehicle, the second light emitting device may be disposed on an obliquely rear side of the first light emitting device.

According to the lighting device for a vehicle having the structure, the second light emitting device disposed at the obliquely rear side of the first light emitting device is provided on a parallel surface with the optical axis of the first light emitting device. Consequently, it is possible to suppress an expansion in a vertical direction of a light emitted from the projection lens.

In the lighting device for a vehicle, the light guide may have a plurality of the light guiding portions and the shielding portion may be formed integrally between the adjacent light guiding portions.

According to the lighting device for a vehicle having the structure, the shielding portion between the adjacent light guiding portions is formed integrally. Therefore, a bonding line between the adjacent light guiding portions can be prevented from being generated on a cutoff line.

In the lighting device for a vehicle, the light guide may have a step for a light diffusion in the emitting portion.

According to the lighting device for a vehicle having the structure, a light which is emitted from the second light emitting device and is incident on the light guiding portion is diffused by the step of the emitting portion. Therefore, the light is emitted from the projection lens in horizontal and upward directions. Thus, it is possible to enhance a visibility. The visibility implies that a pedestrian visually recognizes a light emitted from the lighting device for a vehicle.

In the lighting device for a vehicle, the light guide may have a lens supporting portion which positions and supports the projection lens.

According to the lighting device for a vehicle having the structure, the projection lens is positioned and supported by the lens supporting portion of the light guide. Consequently, it is possible to reliably dispose the projection lens in a predetermined position of the lighting device for a vehicle.

The invention is not restricted to the embodiments but changes and improvements can be made properly and freely. In addition, the materials, shapes, dimensions, numeric values, configurations, numbers and arrangement places of the respective components in the embodiments are optional and are not restricted if the invention can be achieved.

For example, it is apparent that the lighting device for a vehicle can also be applied to a rear combination lamp in place of a front combination light.

What is claimed is:

1. A lighting device for a vehicle comprising:

a projection lens disposed on an optical axis which extends in a longitudinal direction of the vehicle, the projection lens having a focal line which extends in a lateral direction of the vehicle, and the projection lens extending in a direction of the focal line;

a first light emitting device disposed on a rear side of the focal line of the projection lens;

a reflector which reflects light emitted from the first light emitting device toward the focal line;

a shade which shields a part of the light reflected by the reflector;

a second light emitting device disposed on a rear side of the first light emitting device; and a light guide comprising an incident portion into which light emitted from the second light emitting device is introduced, a light guiding portion which guides the light introduced into the incident portion, a shielding portion which forms at least a part of the shade, and an emitting portion coupled to the shielding portion and disposed on the focal line or in a vicinity of the focal line, the emitting portion emitting the light guided by the light guiding portion.

2. The lighting device according to claim 1, wherein the second light emitting device is disposed on an obliquely rear side of the first light emitting device.

3. The lighting device for a vehicle according to claim 1, wherein the light guide comprises a plurality of the light guiding portions and the shielding portion is formed integrally between adjacent ones of the light guiding portions.

4. The lighting device for a vehicle according to claim 1, wherein the light guide comprises a step for diffusing light in the emitting portion.

5. The lighting device for a vehicle according to claim 1, wherein the light guide comprises a lens supporting portion which positions and supports the projection lens.

6. A lighting device for a vehicle, the lighting device comprising:

a projection lens which projects light in a projection direction, the projection lens being disposed on an optical axis which extends in a longitudinal direction of the vehicle and having a focal line which extends in a lateral direction of the vehicle;

a first light emitting device disposed on a rear side of the focal line with respect to the projection direction;

a reflector which reflects light emitted from the first light emitting device toward the focal line;

a shade which shields a part of the light reflected by the reflector;

two second light emitting devices disposed respectively on either side of the first light emitting device in the lateral direction and disposed on a rear side of the first light emitting device; and a light guide comprising an incident portion into which light emitted from the two second light emitting devices is introduced, a light guiding portion which guides the light introduced into the incident portion, a shielding portion which forms at least a part of the shade, and an emitting portion coupled to the shielding portion and disposed on the focal line or in a vicinity of the focal line, the emitting portion emitting the light guided by the light guiding portion.

* * * * *